United States Patent
Wang et al.

(10) Patent No.: US 7,333,928 B2
(45) Date of Patent: Feb. 19, 2008

(54) ERROR-TOLERANT LANGUAGE UNDERSTANDING SYSTEM AND METHOD

(75) Inventors: Huei-Ming Wang, Taipei (TW); Yi-Chung Lin, Keelung (TW)

(73) Assignee: Industrial Technology Research Institute, Hsinchu (TW)

( * ) Notice: Subject to any disclaimer, the term of this patent is extended or adjusted under 35 U.S.C. 154(b) by 799 days.

(21) Appl. No.: 10/321,492

(22) Filed: Dec. 18, 2002

(65) Prior Publication Data

US 2003/0225579 A1 Dec. 4, 2003

(30) Foreign Application Priority Data

May 31, 2002 (TW) ............................... 91111619 A

(51) Int. Cl.
*G06F 17/27* (2006.01)
(52) U.S. Cl. ........................................................ 704/9
(58) Field of Classification Search ................ None
See application file for complete search history.

(56) References Cited

U.S. PATENT DOCUMENTS

| | | | | |
|---|---|---|---|---|
| 5,060,155 A | * | 10/1991 | van Zuijlen | 704/9 |
| 5,418,717 A | * | 5/1995 | Su et al. | 704/9 |
| 5,754,736 A | * | 5/1998 | Aust | 704/252 |
| 6,128,596 A | * | 10/2000 | Mackie | 704/257 |
| 6,138,098 A | * | 10/2000 | Shieber et al. | 704/257 |
| 6,631,346 B1 | * | 10/2003 | Karaorman et al. | 704/9 |
| 6,865,528 B1 | * | 3/2005 | Huang et al. | 704/9 |
| 6,879,950 B1 | * | 4/2005 | Mackie et al. | 704/9 |
| 6,920,420 B2 | * | 7/2005 | Lin | 704/9 |
| 6,952,666 B1 | * | 10/2005 | Weise | 704/9 |
| 6,985,852 B2 | * | 1/2006 | Wang | 704/9 |
| 2002/0082833 A1 | * | 6/2002 | Marasek et al. | 704/251 |

OTHER PUBLICATIONS

Yi-Chung Lin, Huei-Ming Wang, "Error-tolerant Language Understanding for Spoken Dialogue Systems", ICLSP 2000, Oct. 16-20, 2000.*
Manabu Sassano, Takehito Utsuro, "Named Entity Chunking Techniques for Japanese Named Entity Recognition".*
Bernhard Rueber, "Obtaining Confidence Measures from Sentence Probabilities", Eurospeech 1997.*
Rafid A. Sukkar, Chin-Hui Lee, "Vocabulary Independent Discriminative Utterance Verification for Nonkeyword Rejection in Subword Based Speech Recognition", IEEE Transactions on Speech and Audio Processing, vol. 4, No. 6, Nov. 1996.*

* cited by examiner

*Primary Examiner*—Patrick N. Edouard
*Assistant Examiner*—Eric Yen
(74) *Attorney, Agent, or Firm*—Troxell Law Office, PLLC

(57) ABSTRACT

The present invention relates to an error-tolerant language understanding, system and method. The system and the method is using example sentences to provide the clues for detecting and recovering errors. The procedure of detection and recovery is guided by a probabilistic scoring function which integrated the scores from the speech recognizer, concept parser, the scores of concept-bigram and edit operations, such as deleting, inserting and substituting concepts. Meanwhile, the score of edit operations refers the confidence measure achieving more precise detection and recovery of the speech recognition errors. That said, a concept with lower confidence measure tends to be deleted or substituted, while a concept with higher one tends to be retained.

1 Claim, 5 Drawing Sheets

ERROR-TOLERANT LANGUAGE UNDERSTANDING SYSTEM AND METHOD

FIELD OF THE INVENTION

The present invention provides an error-tolerant language understanding system and method. The system and the method are to parse the recognition output, detect the recognition error and recover the detected error. The detecting and recovering process is driven by a probabilistic scoring function that integrates acoustic score, grammar score, example score and confidence measure.

BACKGROUND OF THE INVENTION

General speaking, a spoken dialogue system comprises a speech recognition module and a language understanding module. The speech recognition module transfers the speaker's utterance into a possible sentence list, then the language understanding module uses language and domain knowledge, i.e., grammar, to analyze the sentence list and to form a machine-readable format of speaker's utterance for further processing. FIG. 1 illustrates the flow of the recognition and understanding process in a spoken dialogue system. As shown in FIG. 1, the input utterance signal "tell me forecast in Taipei tonight" 1, after being recognized by the speech recognition module 2, will be represented as sentence list 3. As shown in this example, the sentence list 3 comprises at least one possible word sequence such as "tell me forecast in Taipei tonight" 311, "Miami forecast in Taipei tonight" 312 and "tell me forecast in Taipei at night" 313. The possible sentence list will then be analyzed by the language understanding module 4 and the semantic frame 5, the machine-readable format of speaker's utterance, will be generated.

The speech recognition error is inevitable in spoken dialogue system. Users' utterances in real-world applications are usually disfluent, noisy and ungrammatical. These characteristics seriously degrade the accuracy of speech recognizer and consequently lower the performance of dialogue system. To this end, an error-tolerant language understanding method is highly demanded for dialogue systems.

Recently, the concept-based approach in language understanding (Please refer to U.S. Pat. No. 5,754,736, "System and method for outputting spoken information in response to input speech signals," May 19, 1998.; Kellner, A., B. Rueber, F. Seide and B.-H. Tran, "PADIS—An automatic telephone switchboard and directory information system," Speech Communication, Vol. 23, 1997, pp.95-111.; Yang, Y.-J. and L.-S. Lee, "A Syllable-Based Chinese Spoken Dialogue System for Telephone Directory Services Primarily Trained with a Corpus," in Proceedings of the 5th International Conference on Spoken Language Processing, 1998, pp. 1247-1250.;Nagai, A. and Y. Ishikawa, "Concept-driven speech understanding incorporated with a statistic language model," in Proceedings of the 5th International Conference on Spoken Language Processing, 1998, pp. 2235-2238.) has been widely adopted in dialogue systems to understand users' utterances because of its capability of handling the erroneous and ungrammatical sentence hypotheses generated by the speech recognizer. In this approach, the output from the speech recognizer is first parsed into a concept graph according to a predefined concept grammar. Each path in the concept graph represents one possible concept sequence for the input utterance. Then, some stochastic language models, such as concept-bigram model, are used to find the most probable concept sequence. Since the concept-based approach does not require the input sentences to be fully grammatical, it is robust in handling the sentence hypotheses mixed with speech recognition errors.

FIG. 2 illustrates an embodiment of the concept-based approach. As shown in FIG. 2, the word sequence "tell me forecast in Taipei tonight" is parsed into a forest of concept parses, wherein the forest of concept parses comprises four concept parse tree 11; that is, the word sequence has been parsed into Query 7, Topic 8, Location 9 and Date 10 four concepts. In the embodiment, the words "tell me" have been parsed to be Query 7, the word "forecast" has been parsed to be Topic 8, the word "in" and the word "Taipei" (city) has been parsed to be Location 9, and the word "tonight" has been parsed to be Date 10. The concept sequence 6 corresponding to the forest is ⌜Query Topic Location Date⌟.

Although the concept-based approach has the possibility to select the sentence hypothesis with least recognition errors, it is not able to determine whether the selected one is erroneous or not, not to mention recovering the errors. The stochastic language model in the concept-based approach is used to assess the relative possibilities of all possible concept sequences and select the most probable one. The scores obtained from the language model can be used for a comparison of competing concept sequences, but not for an assessment of the probability that the selected concept sequence is correct. However, due to imperfect speech recognition, there is always a possibility that the selected concept sequence has errors, even if it is the most probable concept sequence. For example, if the output sentence list of recognizing the utterance "tell me forecast in Taipei tonight" comprises only two erroneous sentences such as "Miami forecast in Taipei tonight" and "tell me forecast in Taipei at night", the language understanding module will be forced to pick up a possible one from the erroneous concept sequences ⌜Location (Miami) Query (tell me) Topic (forecast) Location (in Taipei) Date (tonight)⌟ and ⌜Query (tell me) Topic (forecast) Location (in Taipei) Time (at night)⌟.

The major problem of the concept-based approach is that the definition of concept sequence is not specific, so it cannot detect if error happened in the concept sequence, not to mention to correct the error. To this end, we proposed an error-tolerant language understanding method (Please refer to Lin, Y.-C. and H.-M. Wang, "Error-tolerant Language Understanding for Spoken Dialogue Systems," in Proceedings of the 5th International Conference on Spoken Language Processing, Vol. 1, 2000, pp. 242-245.) to improve the robustness of dialogue systems by detecting and recovering the errors arising from speech recognition. The basic idea of the error-tolerant model is using exemplary concept sequences to provide the clues for detecting and recovering errors. In this approach, a concept parser first parses the output of the speech recognizer to concept sequences. Then, a dynamic programming procedure is used to find the most matched pair of concept sequences in the parsed concept sequences and the exemplary concept sequences. The corresponding edit operations (i.e., insertion, deletion, or substitution) are used to determine which concepts in the most probable concept sequence are incorrect and how to recover the errors.

In our previous work, the penalty of an edit operation is obtained from the prior probability of the edit operation. This method is simple to implement but not very accurate. For the robustness consideration, the utterance verification technique (Please refer to Sukkar, R. A. and Lee, C.-H., "Vocabulary Independent Discriminative Utterance Verification for Nonkeyword Rejection in Subword Based Speech Recognition," in IEEE Trans. Speech and Audio Proc., 1996, 4(6):420-429.; Rueber, B., "Obtaining Confidence Measures from Sentence Probabilities," in Proceedings of Eurospeech, 1997, pp.739-742.) provides the confidence level for the result of the speech recognition. Thus, the confidence level gives a strong hint of how the concept to be edited. If the confidence level of a concept is high, the concept tends to be retained; otherwise, it tends to be deleted or substituted. In this invent, we incorporate the confidence measurement into the error-tolerant language understanding model. In our design, the penalty of an edit operation is assessed according to the confidence measure of the corresponding concept. The experimental results show that the new model achieves more improvements than the previous one on understanding the utterances of cellular phone calls. Compared to the concept-based approach, the enhanced error-tolerant model improves the precision rate of concept from 65.09% to 76.32% and the recall rate from 64.21% to 69.13%.

SUMMARY OF THE INVENTION

The primary object of the invention is to provide an error-tolerant language understanding system and method to reduce the negative impact on the system caused by the speech recognition error.

The present invention of an error-tolerant language understanding method comprises the steps as follows: (a). Input at least one recognized word sequence and the corresponding acoustic score; (b). Parse the word sequence to obtain a corresponding concept sequence set; (c). Compare the concept sequence set with at least one exemplary concept sequence to obtain at least one edit operation sequence; (d). Based on the corresponding acoustic score of the word sequence, the corresponding grammar score of the concept sequence, the corresponding example score of the exemplary concept sequence and the corresponding edit operation score to determine the final concept sequence; and (e). Translate the final concept sequence into a semantic frame.

The present invention of an error-tolerant language understanding system comprises a concept grammar database used to store at least one concept grammar rule; a concept parser that uses the concept grammar rules to parse the word sequence to a concept sequence set; an exemplary concept sequence database used to store at least one exemplary concept sequence and a concept checker used to compare the concept sequence set with each exemplary concept sequence in the exemplary concept sequence database to determine the most possible concept sequence and the most possible edit operation sequence. Then the edit operation sequence will be used to edit the concept sequence, and the edited concept sequence will be further translated into a semantic frame.

The present invention presents an error-tolerant language understanding system and method which uses a probabilistic scoring function that integrates acoustic score, grammar score, example score and confidence measure to detect and recover recognition error. According to the probabilistic scoring function, a dynamic programming procedure is used to find the most matched pair of concept sequences in the parsed concept sequence sets and the exemplary concept database. The corresponding edit operations (i.e., insertion, deletion, or substitution) are used to determine which concepts in the most matched concept sequence are incorrect and how to recover them. Incorporating the confidence measure of each concept, the matching process can be more precise than the language understanding model without referring confidence measure. Compared to the concept-based approach, the enhanced error-tolerant model improves the precision rate of concept from 65.09% to 76.32% and the recall rate from 64.21% to 69.13%.

BRIEF DESCRIPTIONS OF THE DRAWINGS

DETAILED DESCRIPTIONS OF THE INVENTION

Figure 1:
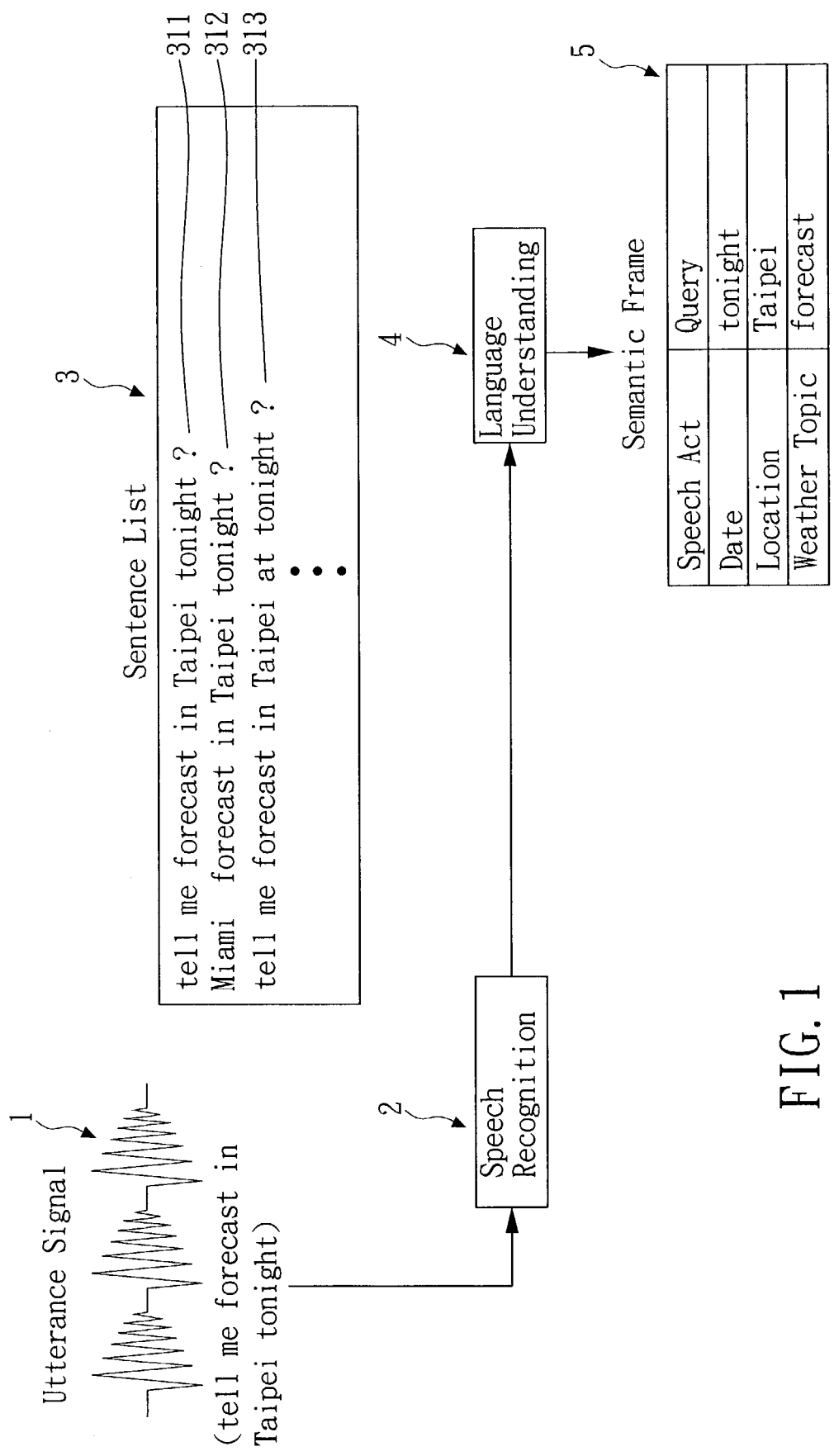
FIG. 1 shows the flow of the recognition and understanding process in a spoken dialogue system.
Figure 2:
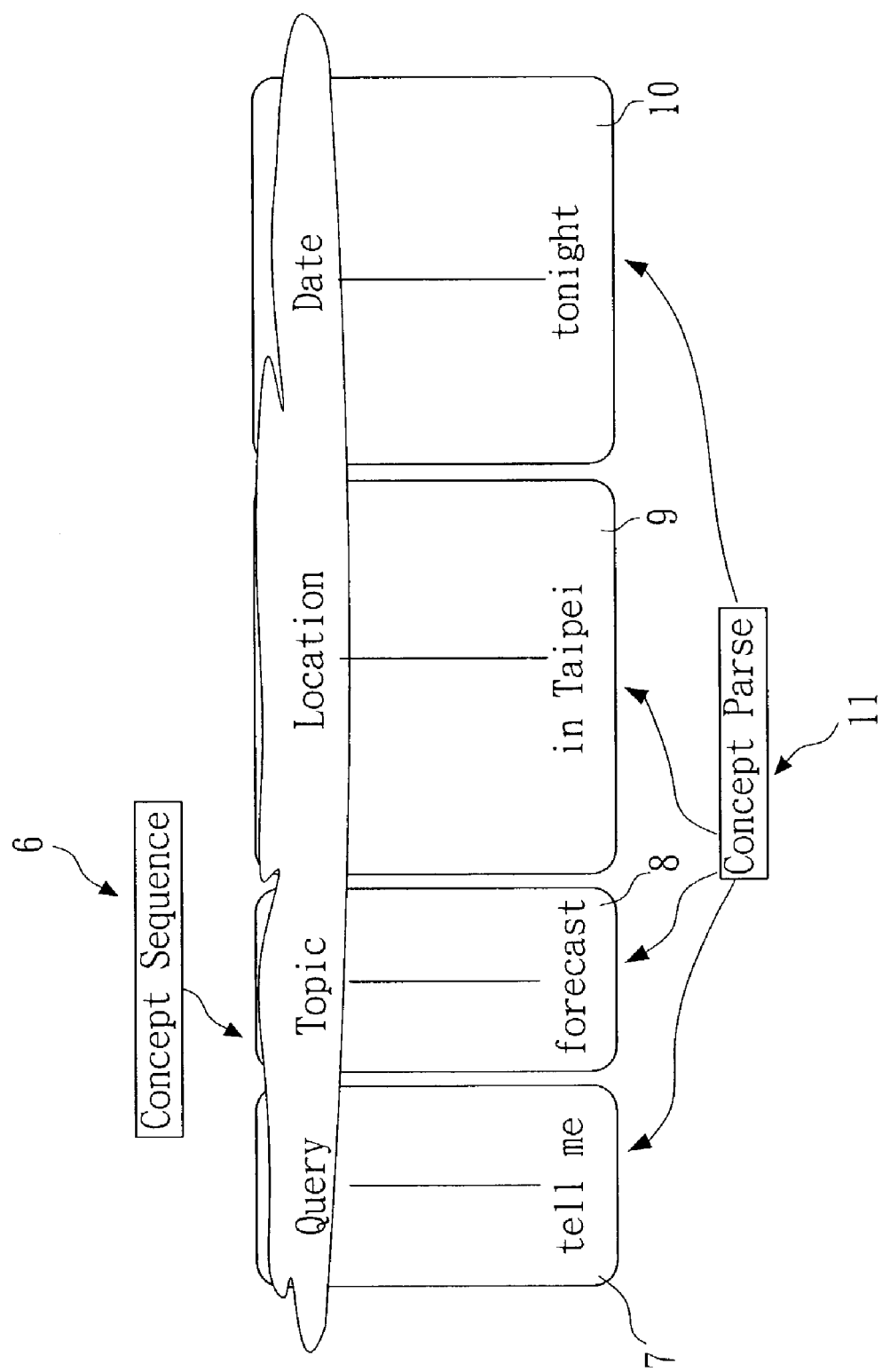
FIG. 2 shows the embodiment of concept-based language understanding approach.

In order to determine if error occurred in speech recognition, the error-tolerant language understanding model uses an exemplary concept sequence database to define the correct concept sequences. In general, the process of understanding speaker's utterance can be represented as the following probability formula:

$$(\hat{W}, \hat{F}, \hat{C}, \hat{M}, \hat{K}, \hat{E}) = \arg\max_{(W,F,C,M,K,E)} P(W, F, C, M, K, E | U) \quad \text{Formula (1)}$$

Wherein U represents the speaker's utterance signal, W represents a possible word sequence in the sentence list that outputs from the speech recognition module, F represents a possible concept parses forest of W, C represents the corresponding concept sequence of F, M represents the corresponding confidence measure sequences of C, K represents an exemplary concept sequence, E is an edit operation sequence that edits C to K, $\hat{W}, \hat{F}, \hat{C}, \hat{M}, \hat{K}, \hat{E}$ are the most possible word sequence, the most possible concept parse forest, the corresponding concept sequence, the corresponding confidence measure sequences, the most possible exemplary concept sequence and the most possible edit operation sequence, respectively. If $\hat{C}=\hat{K}$, the concept sequence is legal and can be used to construct a semantic frame. Otherwise, if $\hat{C}$ and $\hat{K}$ are different, the concept sequence $\hat{C}$ is determined to be incorrect and the edit operations in $\hat{E}$ will be used to fix the errors.

The edit operation can be expressed by <x, y>, wherein x can be the concept of the concept sequence, y can be the concept of the exemplary concept sequence. The edit operation can be classified into four categories, "Insert", "Delete", "Substitute" and "Accept". The following table lists the conditions of each edit operation category, wherein $\epsilon$ represents null value.

| Condition | Operation | Operation Category |
| --- | --- | --- |
| $x = \epsilon, y \neq \epsilon$ | Insert y | Insert |
| $x \neq \epsilon, y = \epsilon$ | Delete x | Delete |
| $x \neq \epsilon, y \neq \epsilon, x \neq y$ | Replace x with y | Substitute |
| $x \neq \epsilon, x = y$ | Accept x | Accept |

For example, if ⌈Topic Location Date Topic⌋ needs to be edited to ⌈Query Location Date Topic⌋, ⌈<Topic, Query><Location, Location><Date, Date><Topic, Topic>⌋ and ⌈<Topic,$\epsilon$><$\epsilon$,Query ><Location, Location><Date, Date><Topic, Topic>⌋ will be two possible edit operation sequences.

The probability term in Formula (1) can be further deduced as:

$$P(W, F, C, M, K, E | U) = P(F, C, M, K, E | W, U)P(W | U) \approx P(F, C, M, K, E | W, U)P(W | U) \quad \text{Formula (2)}$$

$$= \frac{P(W, F, C, M, K, E)}{P(W)} \frac{P(U | W)P(W)}{P(U)} = \frac{P(W, F, C, M, K, E)P(U | W)}{P(U)}.$$

Wherein we assumes P(F,C,M,K,E|W,U)≈P(F,C,M,K,E|W), which means given a word sequence W, the relation between the utterance signal U and the concept parses forest F, the concept sequence C, the confidence measure sequences M, the exemplary concept sequence K, the edit operation sequence E can be ignored. Moreover, in the selection of the most possible concept sequence C for the utterance signal U, the value of the probability P (U) is a constant and can be ignored. Thus, the process of understanding the speaker's utterance can be deduced from Formula (1) to Formula (3) as follows:

$$(\overset{\vee}{W}, \overset{\vee}{F}, \overset{\vee}{C}, \overset{\vee}{M}, \overset{\vee}{K}, \overset{\vee}{E}) = \underset{(W,F,C,M,K,E)}{\arg\max} \; P(W, F, C, M, K, E)P(U | W). \quad \text{Formula (3)}$$

Wherein, the probability P(U|W) is the likelihood probability to the utterance signal U when the user want to utter the word sequence W. This probability is provided by the speech recognizer. The other term in Formula (3) is further deduced as:

$$P(W, F, C, M, K, E) = P(W, F | C, M, K, E)P(C, M, E | K)P(K) \approx P(F | C)P(C, M, E | K)P(K) \quad \text{Formula (4)}$$

$$\approx P(F | C)P(E | M)P(M | K)P(K) = P(F | C)P(E | M)P(M)P(K).$$

Wherein we assume P(W,F|C,M,K,E)≈P(W,F|C) which means given a concept sequence C, the relation between the concept parses forest F, the word sequence W, and the confidence measure sequences M, the exemplary concept sequence K, the edit operation sequence E can be ignored. Moreover, since the terminal nodes of the concept parses forest F is the word sequence W, so P(W,F|C)=P(F|C). Thus P(W,F|C,M,K,E)≈P(F|C). For the term P(C,M,E|K), the edit operation sequence E implies the concept sequence C by editing it to the exemplary concept sequence K, so P(C,M,E|K)=P(M,E|K).

More; for term P(M,E|K)=P(E|M,K)P(M|K), we assume that given the confidence measure sequences M, the relation between the edit operation sequence E and the exemplary concept sequence K can be ignored, so P(E|M,K)≈P(E|M). Thus P(C,M,E|K)≈P(E|M)P(M|K), wherein the confidence measure sequences M is not relevant to the exemplary concept sequence K, so P(M|K)=P(M), and P(M) is a uniform distribution and can be ignored.

P(F|C) in Formula (4) is estimated by the stochastic context-free grammar model in concept parser as the following formula, $$P(F | C) \approx \prod_{T \in F, A \to \alpha \in T} P(\alpha | A). \quad \text{Formula (5)}$$

Wherein T is a concept parse in F and A→α is one of the context-free grammar rules that assemble T. A is a left-hand-side symbol and α is a right-hand-side symbol.

The probability P(K) in Formula (4) can be estimated by the bigram probability model as follows:

$$P(K = k_1^m) \approx \prod_{i=1}^{m} P(k_i | k_{i-1}). \quad \text{Formula (6)}$$

Wherein m is the concept number of K, $k_1^m$ is the brief note of $k_1 \ldots k_m$ and $k_i$ is the $i^{th}$ concept.

The probability P(E|M) in the formula can be simplified as follows:

$$P(E = e_1 \ldots e_n | M) = P(e_1^n | M_1 \ldots M_X) \approx \prod_{i=1}^{n} P(e_i | M_1 \ldots M_X) \approx \prod_{i=1}^{n} \prod_{h=1}^{X} P(e_i | M_h). \quad \text{Formula (7)}$$

Wherein n is the number of edit operation of the E, $e_1^n$ is the brief note of $e_1 \ldots e_{n,ei}$ is the $i^{th}$ edit operation. M is the corresponding confidence measure sequences $M_1 \ldots M_X$ of the concept sequence, which means there are X number of confidence measure modules that generate X number of confidence measures for each word. The confidence measure of a concept is obtained by summing up the confidence measures of its corresponding words. The h-th confidence measure sequence corresponding to a concept sequence of r concepts is expressed as $M_h = \delta_{h,1} \ldots \delta_{h,r} = \delta_{h,1}^{h,r}$, where $\delta_{h,i}$ denotes the i-th confidence measure in the h-th confidence measure sequence.

Formula (1) can be written as follows:

$$\begin{aligned}(W, F, C, M, K, E) &= \underset{(W,F,C,M,K,E)}{\arg\max} \log\Biggl\{ P(U|W) \times \prod_{T\in F, A\to\alpha\in T} P(\alpha|A) \times \prod_{i=1}^{m} P(k_i|k_{i-1}) \times \\ &\quad \prod_{e=<\varepsilon,k_q>\in E} P(e) \times \prod_{e=<c_p,g>\in E} \prod_{h=1}^{X} P(e|\delta_{h,p}) \Biggr\} \\ &= \underset{(W,F,C,M,K,E)}{\arg\max} \{S_W + S_F + S_K + S_E\}.\end{aligned}$$

Formula (8)

Wherein the $S_W = \log P(U|W)$ is the acoustic score from speech recognizer, the $$S_F = \sum_{T\in F, A\to\alpha\in T} \log P(\alpha|A)$$

is the grammar score from concept parser, the $$S_K = \sum_{i=1}^{m} \log P(k_i|k_{i-1})$$

is the example score, and the $$S_E = \sum_{e\in E, e=<\varepsilon,k_q>} \log P(e) + \sum_{e\in E, e=<c_p,g>} \sum_{h=1}^{X} \log P(e|\delta_{h,p})$$

is the edit operation score.

Due to the modeling error caused by approximations and the estimation error caused by insufficient training data, different kinds of scores have different discrimination powers. To enhance the overall discrimination power in choosing the most probable candidate, scores should be adequately weighted. Therefore, we define the following scoring function to guide the concept checker for selecting the most possible concept sequence, detecting and recovering the errors in the selected one.

$$S(W,F,C,M,K,E) \equiv w_1 \times S_W + w_2 \times S_F + w_3 \times S_K + w_4 \times S_E.$$

Wherein $w_1$, $w_2$, $w_3$, $w_4$ are the weights that are greater than zero, and the value can be obtained from experiments.

Figure 3:
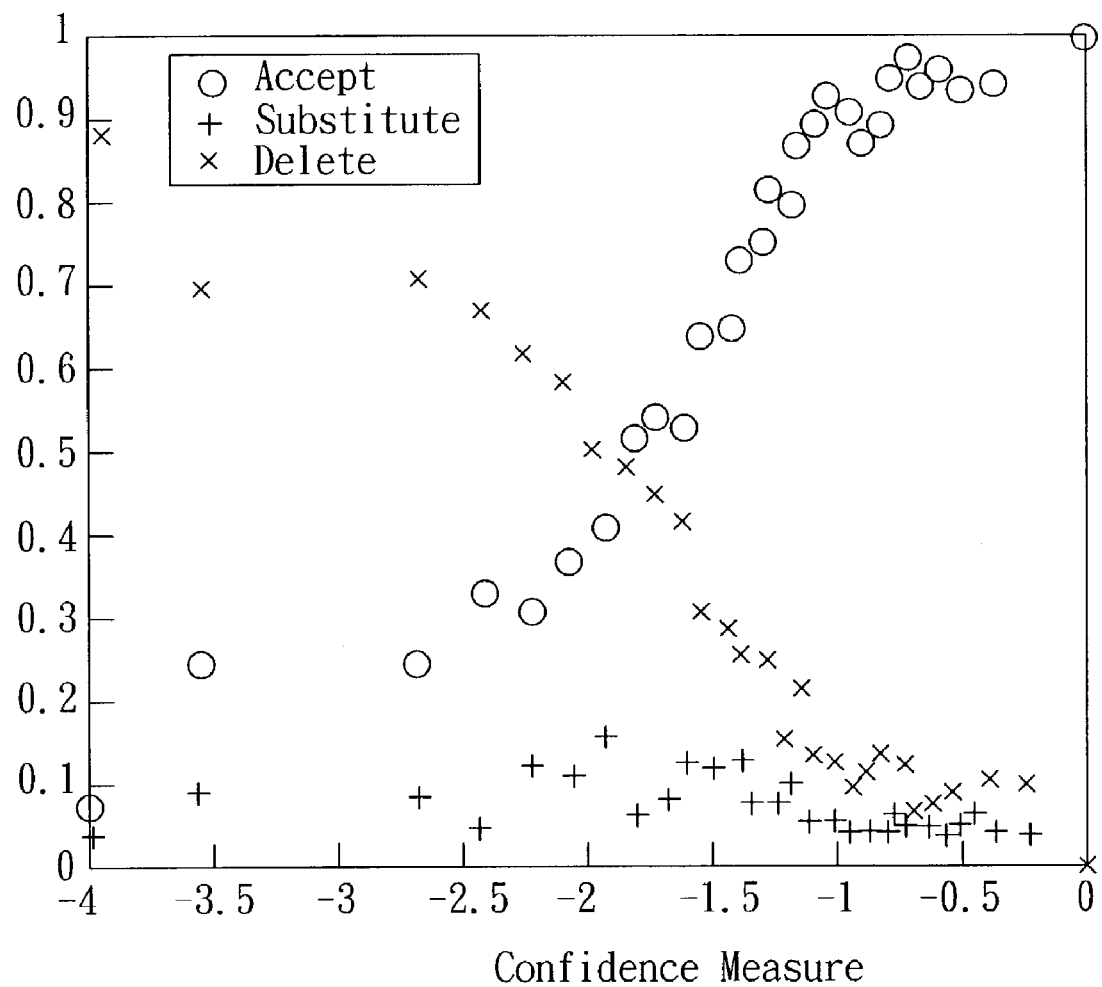
FIG. 3 shows the statistical diagram of the confidence measure/edit operation.

In general, the value of the confidence measure is a real number, so the probability $P(e|\delta_{h,p})$ can not be estimated by counting the occurrence of the $(e, \delta_{h,p})$. To solve the problem, a probability curve fitting method is adopted to estimate $P(e|\delta_{h,p})$. Firstly, the $(e, \delta_{h,p})$ of each concept sequence of training corpus will be calculated by comparing with the exemplary concept sequences in the exemplary concept sequence database. Then, $(e, \delta_{h,p})$ will be sorted by the confidence measure $\delta_{h,p}$ and classified into several fixed-size groups. For every group, the probability of an edit operation category and the mean of confidence measure are computed. In FIG. 3, every circle represents the probability of "accept" edit operation and the mean of confidence measure of that group, so as to the two kinds of cross for "substitute" and "delete". Finally, a polynomial curve for each edit operation category can be found to fit the data dots of the edit operation category in a least-square sense.

As shown in FIG. 3, it is obvious that the confidence measure and the edit operation have extremely close relationship. For the concept with higher confidence, the probability of the "accept" operation is higher than the other two operations, on the other hand, for the concept with lower confidence, the probability of the "delete" operation is higher than the other operations.

Figure 4:
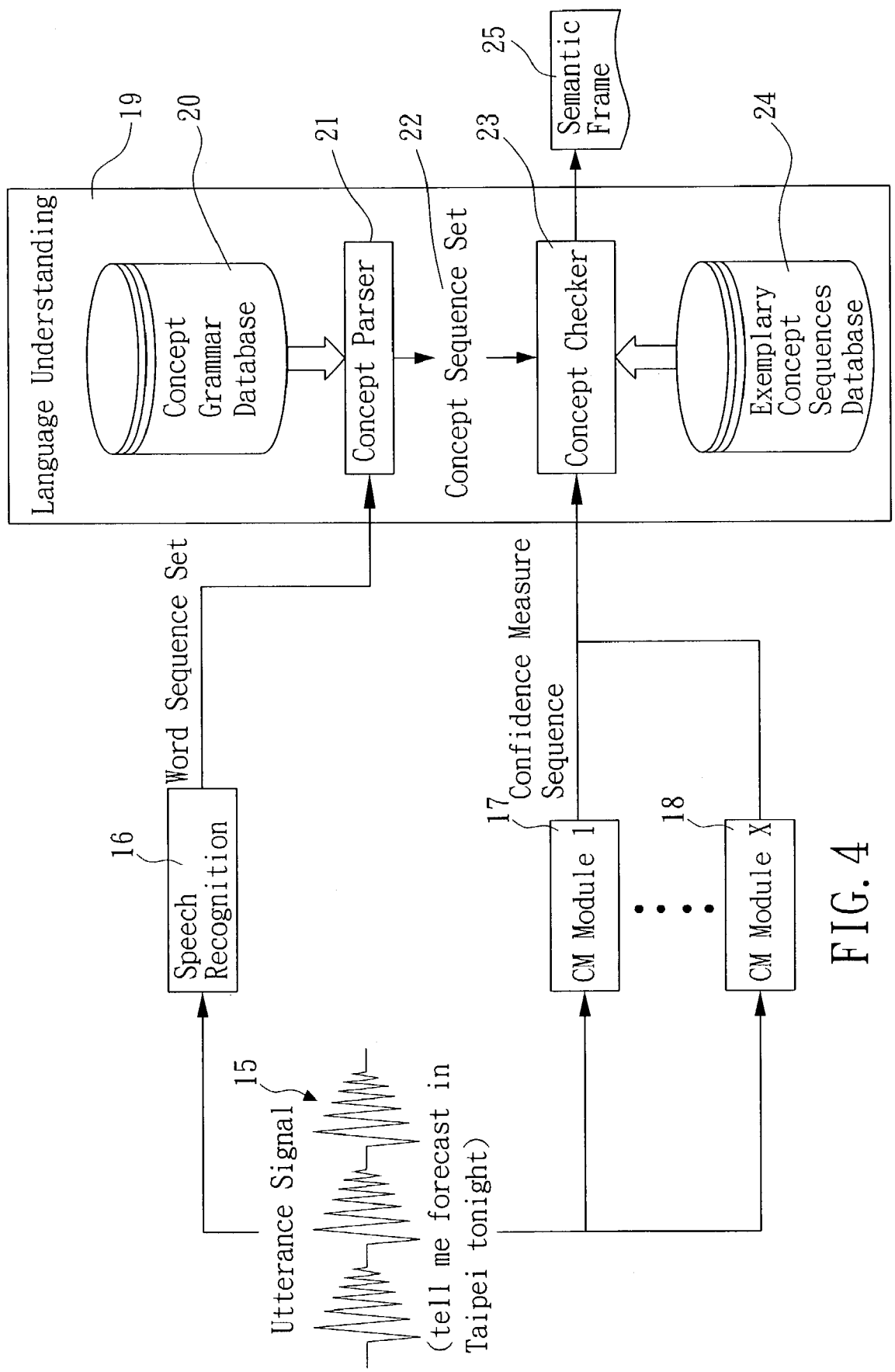
FIG. 4 shows the system architecture of error-tolerant language understanding method.

FIG. 4 shows the system architecture of the error-tolerant language understanding method. As shown in FIG. 4, the utterance signal 「tell me forecast in Taipei tonight」 15 is recognized by the speech recognition module 16, then, the recognized word sequence set and the corresponding acoustic score of each word are input to the language understanding module 19. The language understanding module 19 comprises a concept grammar database 20 used to store concept grammar rules; a concept parser 21 uses the concept grammar rules in the concept grammar database 20 to parse each word sequence in the recognized word sequence set to be a concept sequence set 22; an exemplary concept sequence database 24 used to store exemplary concept sequences; at least one confidence measure module (17 and 18) is used to generate the confidence measures of the word corresponding to the speaker's utterance signal; a concept checker 23 used to compare the concept sequence set 22 with the exemplary concept sequence in the exemplary concept sequence database 24 to determine the most possible concept sequence and the most possible edit operation sequence, then the concept sequence will be edited according to the edit operation sequence and translated into a semantic frame 25.

In FIG. 4, the input of the language understanding module 19 is a word sequence set, the word sequence set could be in the form of sentence list or word graph. Every word w in the word sequence set is tagged with an acoustic score $s_w$ obtained from the speech recognition module 16. The word sequence $S_W$ in Formula (8) is the sum of the acoustic score of each word in the word sequence W, e.g.

$$S_W = \sum_{w \in W} S_w.$$

The concept parser 21 uses the concept grammar database 20 to parse the word sequence to be concept parses forest set and to generate the corresponding concept sequences. The concept grammar database 20 comprises at least one concept grammar rule, and the concept grammar rule is the context-free grammar. Since the concept grammar does not include the start symbol, the concept parser parses input data in a bottom-up way (Please refer to Chappelier, J.-C. and M. Rajman, "A Generalized CYK Algorithm for Parsing Stochastic CFG," in Proc. of the 1st Workshop on Tabulation in Parsing and Deduction, Paris, France, 1998, pp. 133-137.). The score of concept $c_i$ after parsing by concept parser 21 can be calculated as:

$$S_{AG}c_i = w_1 \times \sum_{w \in T_i} S_w + w_2 \times \sum_{A \to \alpha \in T_i} \log P(\alpha | A).$$

Wherein $T_i$ is the corresponding concept parse of concept $c_i$, the log $P(\alpha|A)$ is the grammar score of generating $T_i$ by using the concept grammar $A \to \alpha$, $w_1$, $w_2$ are the weights for acoustic and grammar score as mentioned above.

The concept sequence checker 23 is used to compare the concept sequence set and the exemplary concept sequences in the exemplary concept sequence database 24, and to select the most possible concept sequence and the most possible edit operation sequence. Then the edit operation sequence is used to edit the selected concept sequence and the edited concept sequence will be translated into a semantic frame 25. The exemplary concept sequence database and the concept sequence set could be represented in the form of concept graph. The concept graph is a directed acyclic graph and the directed network comparison method (Please refer to Kruskal, J. B., and D. Sankoff, "An anthology of algorithms and concepts for sequence comparison" in Time Warps, String Edits, and Macromolecules: The Theory and Practice of Sequence Comparison, D. Sankoff and J. B. Kruskal (Eds.), Addison-Wesley Publishing Company, 1983, pp. 265-310.) will be used for comparing the parsed concept graph and the exemplary concept graph. The dynamic programming algorithm will be used to find out the path of the highest score according to formula (9).

Wherein $S_{i,j}$ is the highest score when comparing the $(c_i,k_j)$, $c_i$ represents any preceding concept before the $i^{th}$ concept $c_i$ in the concept graph. Similar to $k_j$, $k_j$ represents any preceding concept before the $j^{th}$ concept $k_j$ in the exemplary concept graph. The $s_K e_j|k_j = w_3 \times \log P e_j|k_j$ is the weighted example score as Formula (6) and the $s_E(\bullet, \bullet)$ is the weighted edit operation score as Formula (7):

$$S_E(c_i, k_j) = \begin{cases} w_4 \times \log P(e \in \text{Insert}) & \text{if } c_i = \varepsilon \\ w_4 \times \log \sum_{h=1}^{X} P(e \in \text{Delete}|\delta_{h,i}) & \text{if } k_j = \varepsilon \\ w_4 \times \log \sum_{h=1}^{X} P(e \in \text{Substitute}|\delta_{h,i}) & \text{if } c_i, k_j \neq \varepsilon \text{ and } c_i \neq k_j \\ w_4 \times \log \sum_{h=1}^{X} P(e \in \text{Accept}|\delta_{h,i}) & \text{if } c_i, k_j \neq \varepsilon \text{ and } c_i = k_j \end{cases}$$

Figure 5:
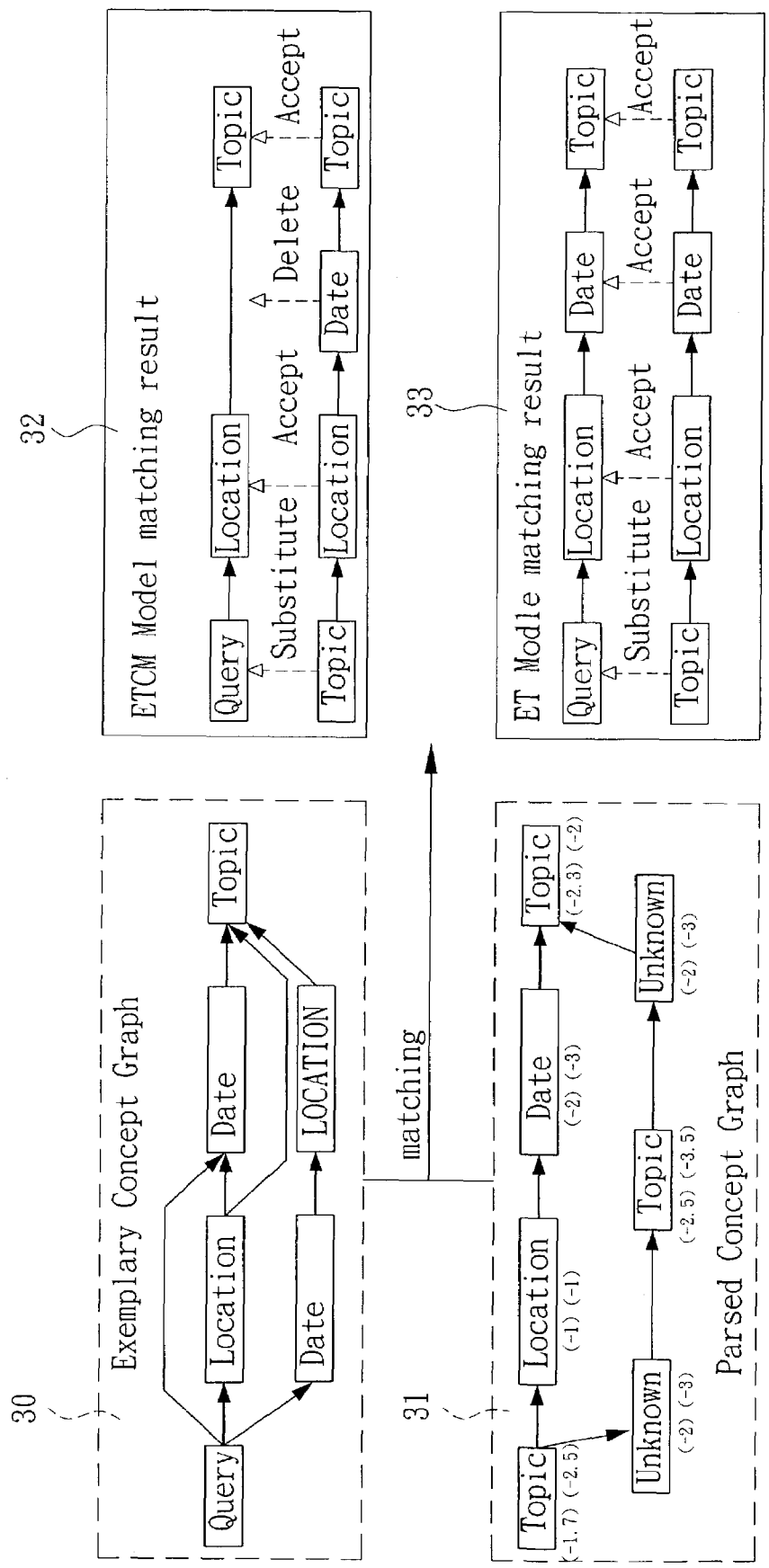
FIG. 5 shows the examples of ET Model and ETCM Model.

FIG. 5 shows an example that compares the error-tolerant language understanding model with referring confidence measure (ETCM model) and the prior error-tolerant language understanding model without referring confidence measure (ET model). In the FIG. 5, the exemplary concept graph 30 defines four exemplary concept sequences: ⌈Query Date Topic⌋, ⌈Query Location Date Topic⌋, ⌈Query Location Topic⌋ and ⌈Query Date Location Topics⌋; the parsed concept graph 31 of the result of the recognition comprises two concept sequence: ⌈Topic Location Date Topic⌋ and ⌈Topic <Unknown> Topic <Unknown> Topic⌋. As shown in FIG. 5, there are two brackets under each concept in the parsed concept graph, the first one is the $s_{AG}(c_i)$ score for every concept and the second one is the confidence measure $\delta_i$ for every concept (There is only one confidence measure in this example). The correct answer of this example is the ⌈Query Location Topic⌋, however the speech recognition error causes that the parsed concept graph does not include the correct answer. Comparing the $s_{AG}(c_i)$ scores, the most possible concept sequence can be determined as ⌈Topic Location Date Topic⌋, wherein the confidence $\delta_{Date}=-3$ of the error concept Date is bad. In the ET Model 33, the edit operation sequence with more "accept" operations tend to have higher score, so the best comparison result in ET Model 33 could be the parsed concept sequence ⌈Topic Location Date Topic⌋ and the exemplary concept sequence ⌈Query Location Date Topic⌋ with the edit operation sequence ⌈Substitute, Accept, Accept, Accept⌋, and the final concept sequence will be ⌈Query Location Date Topic⌋. However, in the ETCM Model 32, the $s_E(\text{Date},\varepsilon)=\log P(e \in \text{Delete}|\delta_{Date}=-3)$ is greater than $s_E(\text{Date, Date})=\log P(e \in \text{Accept}|\delta_{Date}=-3)$, so the best comparison result could be the parse concept sequence ⌈Topic Location Date Topic⌋ and the exemplary concept sequence ⌈Query Location Topic⌋ with the edit operation sequence ⌈Substitute Accept Delete Accept⌋, and the final concept sequence will be ⌈Query Location Topic⌋.

$$S_{i,j} = \max \begin{cases} S_{AG}(c_i) + S_E(c_i, \phi) + \max_{i\%} S_{i\%,j} \\ S_{AG}(c_i) + S_E(c_i, k_j) + \max_{i\%,j\%} \{S_{i\%,j\%} + S_K(k_j | k_{j\%})\} \\ S_E(\phi, k_j) + \max_{j\%} \{S_{i,j\%} + S_K(k_j | k_{j\%})\} \end{cases}$$

Formula (9)

In order to make a comparative study, three different models are tested in our experiments. The first model is the concept-bigram model (named CB model). The second model is the error-tolerant model without referring confidence measure (named ET model). In this model, the edit score is obtained from the prior probabilities of the edit operations. The third model is the error-tolerant model referring confidence measures (named ETCM model) in this invent.

To verify the improvement of the integrated confidence measure error-tolerant language understanding model (ETCM model) of the present invention, we compare the probability-oriented error-tolerant language understanding model (ET model) and the concept-bigram model (CB Model).

The above models are tested on a corpus collected by our Chinese spoken dialogue system, named eStock. This dialogue system provides the stock quote information of over 300 companies in Taiwan's stock market. A total of 2,081 utterances made by cellular phone calls are used in our experiments. In order to reduce the error of performance assessment, the v-fold cross validation method (Please refer to Breiman, L., Friedman, J. H., Olshen, R. A., and Stone, C. J., Classification and regression trees. Chapman & Hall, New York. 1984.) is used in our experiments. The approach says that the collected utterances are randomly cast into v subsets. For every model, a total of v simulations are conducted. Every simulation holds out one particular subset for testing and uses the other two subsets for training. The present experiment adapts the method of v=3. Table 2 is the performance comparison for CB/ET/ETCM Model, and the error reduction rate (ERR) will be the indicator of the performance improvement. In eStock corpus, the precision of ETCM Model outperforms ET Model by 15.46%, while the recall rate kept similar to ET Model because of the low communication quality of the wireless phone. Though the correct precision is hard to obtain, ETCM model still has 13.75% improvement over the CB Model. The experiment proved that the superiority of the integrated confidence measure error-tolerant language understanding model (ETCM Model) of the present invention.

TABLE 2

The performance comparison for the CB/ET/ETCM Model for the stock quote corpus.

| Model | Precision | Recall Rate |
| --- | --- | --- |
| CB | 65.09% | 64.21% |
| ET | 71.99% | 68.17% |
| ETCM | 76.32% | 69.13% |
|  | ERR | ERR |
| ETCM Improvement to CB | 32.17% | 13.75% |
| ETCM Improvement to ET | 15.46% | 3.02% |

While the present invention has been shown and described with reference to a preferred embodiment thereof, and in terms of the illustrative drawings, it should be not considered as limited thereby. Various possible modification, omission, and alterations could be conceived of by one skilled in the art to the form and the content of any particular embodiment, without departing from the scope and the sprit of the present invention.

What is claimed is:

1. An error-tolerant language understanding method comprising the following steps:
   (a) Inputting at least one word sequence and its corresponding acoustic score;
   (b) Parsing said word sequence to obtain a corresponding concept sequence set;
   (c) Attach at least one confidence measure sequence to each concept sequence in the said concept sequence set and compare the concept sequences together with their associated confidence measure sequences against at least one exemplary concept sequence to obtain at least one edit operation sequence;
   (d) According to said acoustic score of said word sequence, the corresponding grammar score of a concept sequence in said concept sequence set, the corresponding example score of said exemplary concept sequence and the corresponding edit operation score of said edit operation sequence to determine the most possible concept sequence; and
   (e) Translating said most possible concept sequence into a semantic frame, wherein the step (d) further comprising:

Using a probabilistic scoring function to determine said the most possible concept sequence, and said probabilistic scoring function is formulated as follows:

$$\left(\acute{W}, \acute{F}, \acute{C}, \acute{M}, \acute{K}, \acute{E}\right) = \underset{(W,F,C,M,K,E)}{\mathrm{argmax}} \{S_W + S_F + S_K + S_E\}$$

wherein $\acute{W}$ is the most possible word sequence in the sentence list that outputs from the speech recognition module, $\acute{F}$ is the most possible concept parse forest, $\acute{C}$ is the corresponding concept sequence, $\acute{M}$ is the corresponding confidence measure sequences, $\acute{K}$ is the most possible exemplary concept sequence and $\acute{E}$ is the most possible edit operation sequence, $S_W$ is the acoustic score, $S_F$ is the grammar score, $S_K$ is the example score and $S_E$ is the edit operation score, wherein $$S_W = \log P(U \mid W), \; S_F = \sum_{T \in F, A \to \alpha \in T_j} \log P(\alpha \mid A), \; S_K = \sum_{i=1}^{m} \log P(k_i \mid k_{i-1}),$$

$$S_E = \sum_{e \in E, e = <\varepsilon, k_q>} \log P(e) + \sum_{e \in E, e = <c_p, g>} \sum_{h=1}^{X} \log P(e \mid \delta_{h,p}),$$

U represents a utterance signal, W represents said possible word sequence in the sentence list that outputs from the speech recognition module, F represents a possible concept parses forest of W T is a concept parse tree of said concept parse forest F, A→α is a concept grammar that generates said T, A is a left-hand-side symbol and α is right-hand-side symbols, m is the number of concept in exemplary concept sequence K, $k_1^m$ is a brief note of $k_1 \ldots k_m$, $k_i$ is the $i^{th}$ concept, e is an edit operation in edit operation sequence E, said utterance signal U is processed with X number of confidence measure modules and X number of confidence measure sequences are generated, one of said confidence measure sequences $M_h$ corresponding to the r number of $c_1 \ldots c_r$ concepts is expressed as $$M_h = \delta_{h,1} \cdots \delta_{h,r} = \delta_{h,1}^{h,r}, \; h \sim [1, X].$$

* * * * *